Dec. 21, 1965    D. L. DE MARTELAERE ET AL    3,224,642
AUTOMATIC METERING SYSTEM FOR PLURAL COMPONENT MATERIALS
Filed Feb. 13, 1964    7 Sheets-Sheet 1
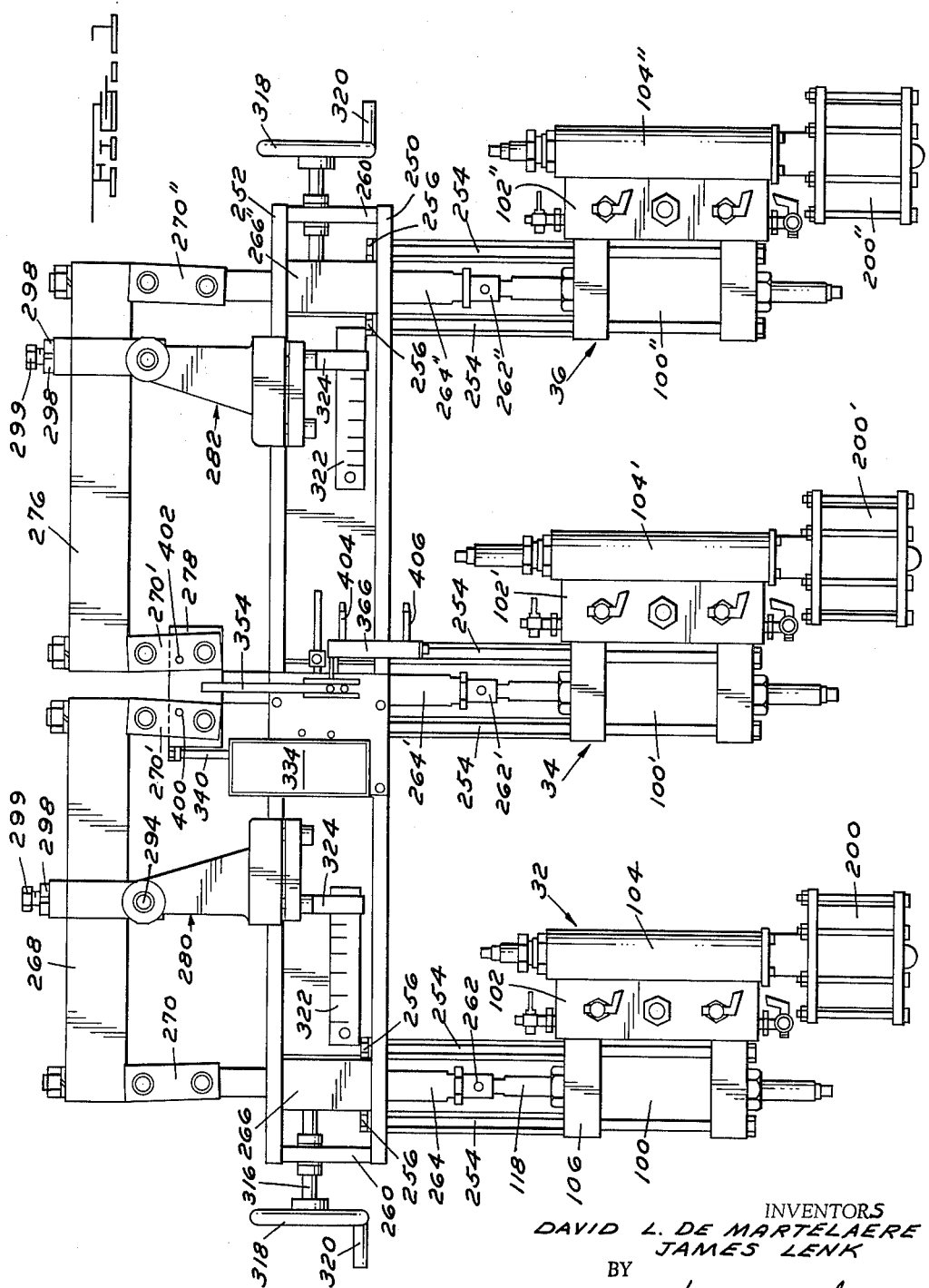
INVENTORS
DAVID L. DE MARTELAERE
JAMES LENK
BY
Burton & Parker
ATTORNEYS Dec. 21, 1965  D. L. DE MARTELAERE ET AL  3,224,642
AUTOMATIC METERING SYSTEM FOR PLURAL COMPONENT MATERIALS
Filed Feb. 13, 1964  7 Sheets-Sheet 2

INVENTORS
DAVID L. DE MARTELAERE
JAMES LENK
BY
Burton & Parker
ATTORNEYS

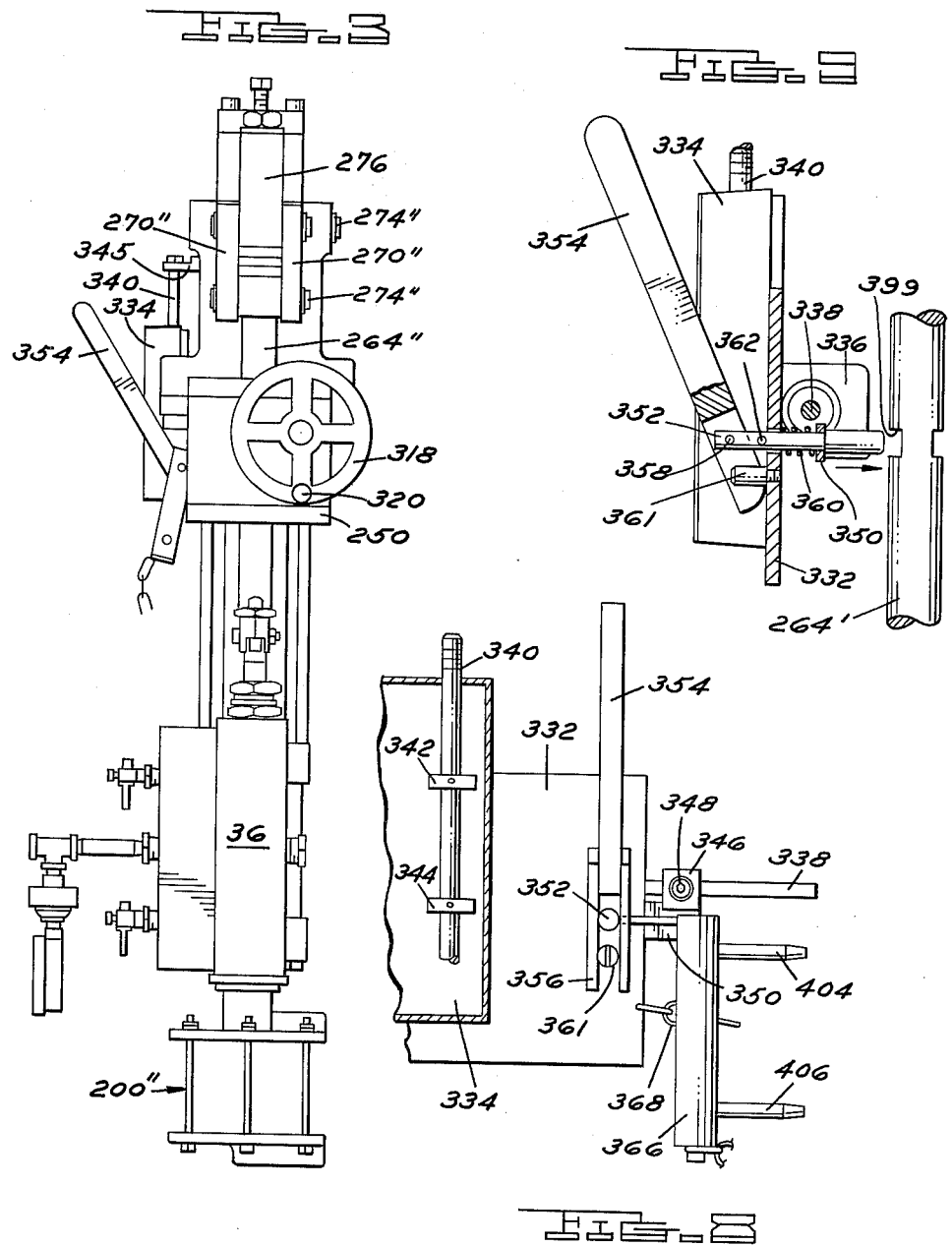

Dec. 21, 1965   D. L. DE MARTELAERE ET AL   3,224,642
AUTOMATIC METERING SYSTEM FOR PLURAL COMPONENT MATERIALS
Filed Feb. 13, 1964                                    7 Sheets-Sheet 4

INVENTORS
DAVID L. DE MARTELAERE
JAMES LENK
BY
Burton & Parker
ATTORNEYS

Dec. 21, 1965  D. L. DE MARTELAERE ET AL  3,224,642
AUTOMATIC METERING SYSTEM FOR PLURAL COMPONENT MATERIALS
Filed Feb. 13, 1964  7 Sheets-Sheet 5

INVENTORS
DAVID L. DE MARTELAERE
JAMES LENK
BY
Burton & Parker
ATTORNEYS

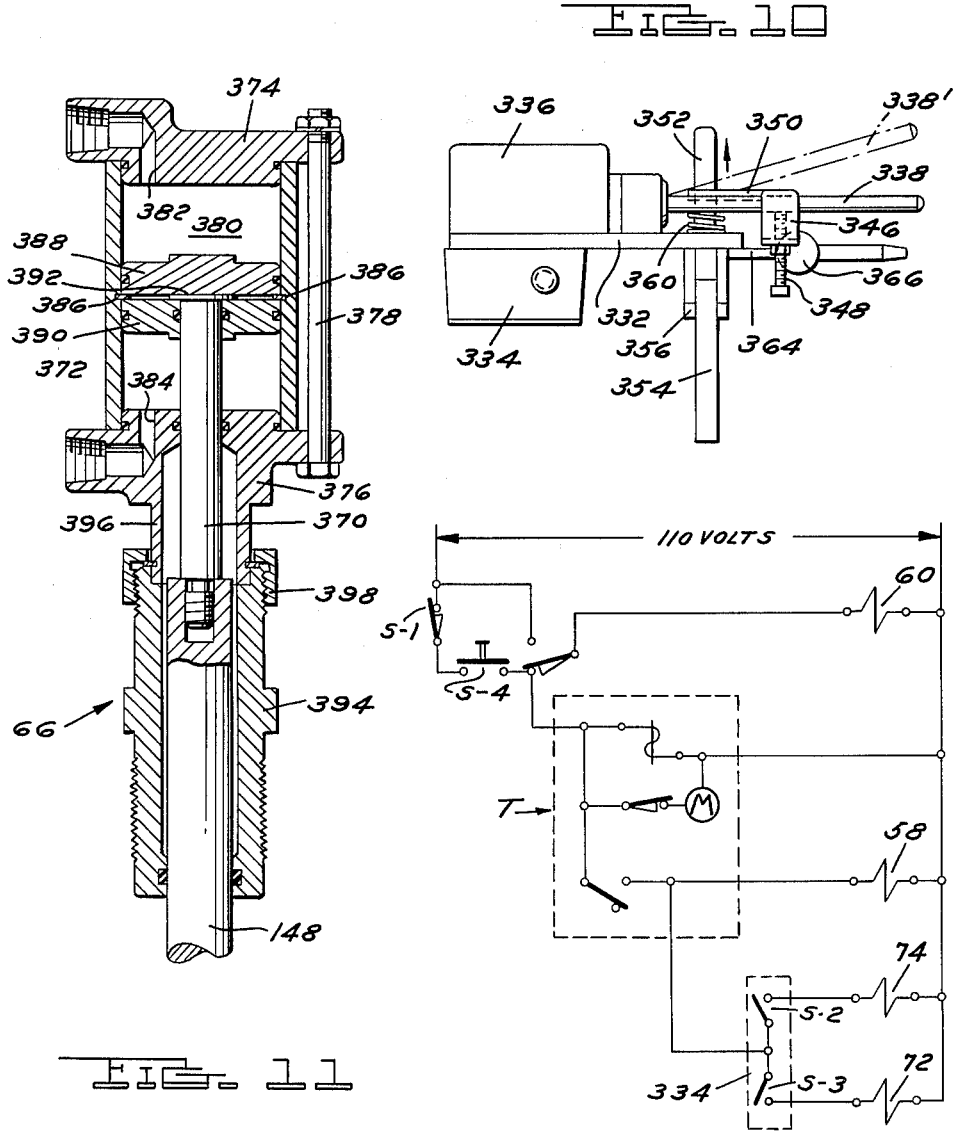

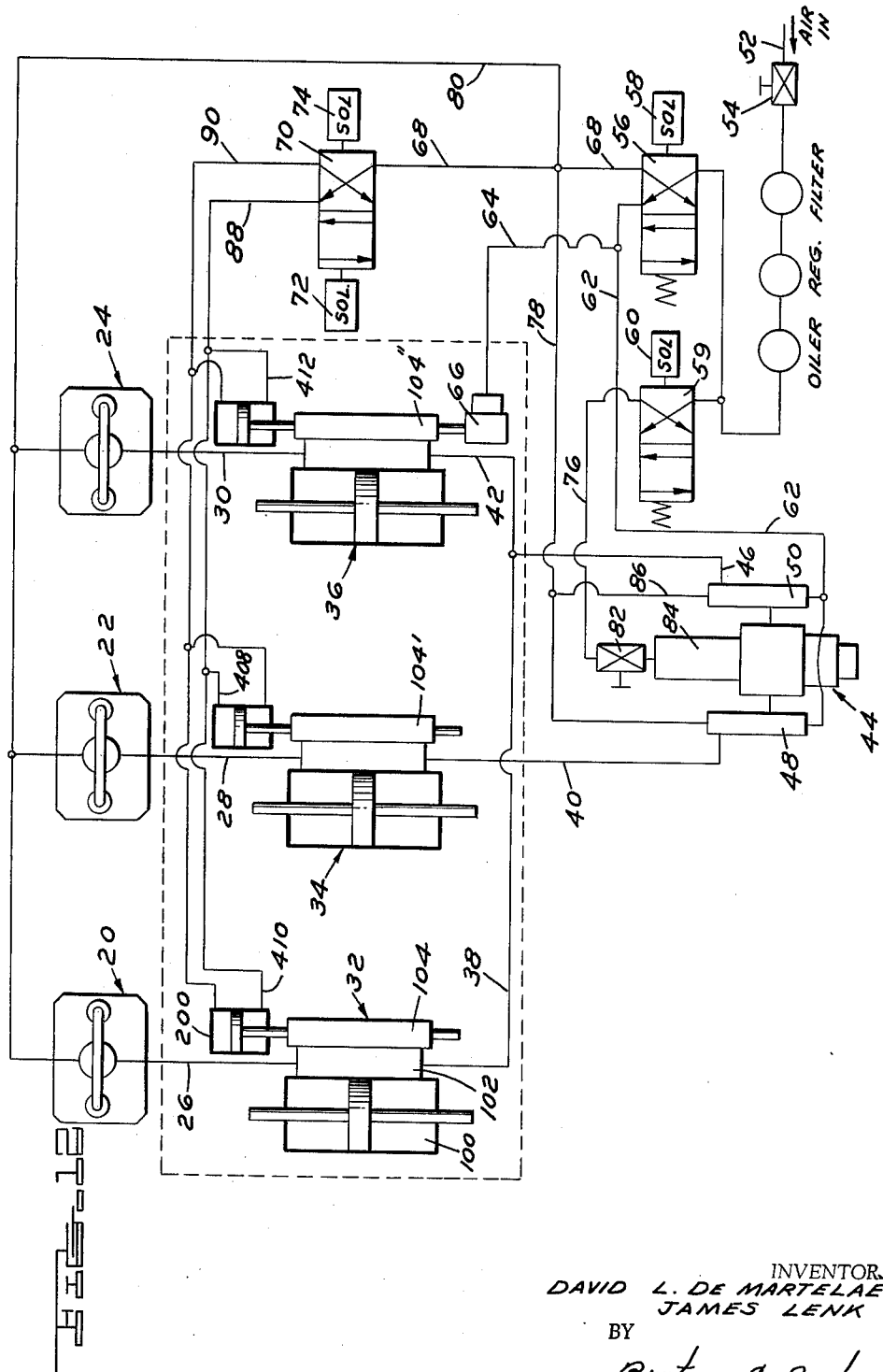

3,224,642
AUTOMATIC METERING SYSTEM FOR PLURAL COMPONENT MATERIALS
David L. De Martelaere, Southfield, and James Lenk, Roseville, Mich., assignors to Pyles Industries, Inc., Southfield, Mich., a corporation of Michigan
Filed Feb. 13, 1964, Ser. No. 344,682
10 Claims. (Cl. 222—134)

This invention relates to a system having the capability of simultaneously receiving a plurality of separate flowable materials and continuously metering the individual materials in determined relative proportions and delivering the metered quantities, still separated, to a mixing device within which they are mixed together and dispensed. The invention also relates to improved proportional metering apparatus for plural-part materials wherein the relative proportions of the materials being measured may be easily and accurately varied.

The invention has particular applicability to the proportional metering of base and accelerator materials for plural-part adhesives, sealants and the like which are of rapidly increasing importance to industry. Such adhesives and sealants have achieved wide acceptance in the aircraft, missile and automotive industries, and new uses for these products are being conceived almost daily. They generally comprise a base component and one or more accelerator or catalyst components which are mixed together immediately prior to use to provide a curable compound. The relative proportions of the individual materials must be closely controlled to insure a resultant product possessing the required physical characteristics of resistance, strength, durability, etc. for the particular application.

The component materials, base and accelerator, are delivered to the customer in separate sealed containers, and each material is pumped either directly from its container or from a tank to a metering device where it is accurately metered in quantities bearing a specific relationship to the remaining components. From the metering function the materials are separately delivered to a mixing device where they are intimately intermixed to provide the desired product for the particular job. This invention relates to the system for metering the component materials in the correct proportional amounts and delivering the metered quantities to the mixing and dispensing device. While the description will be directed toward the handling of base and accelerator materials described above, it will be apparent that the apparatus may be used to proportionally meter any fluid materials wherein accurate metering is essential.

It is a primary object to provide apparatus for the purpose above described which is operable to accurately meter proportional amounts of a plurality of materials and to deliver the metered quantities to a mixing and dispensing device, and which apparatus is selectively adjustable on-the-job to vary the relative proportions between the materials being metered.

Another object is the provision of metering apparatus for handling plural-part compounds such as adhesives, sealants and the like and wherein the metering function is achieved by a plurality of positive displacement piston-cylinder assemblies arranged in spaced parallel relation and interconnected by a lever of the first order having an adjustable fulcrum whereby the relative strokes of the pistons may be varied by movement of the fulcrum to change the length of the respective lever arms coupling the assemblies together.

A further object is the novel construction and arrangement of each metering assembly including a piston-cylinder portion, a manifold portion, and a valve portion, wherein the entire assembly may be easily assembled and/or disassembled for repair or replacement of individual parts without disturbing the remainder of the apparatus. A concomitant object is such a metering assembly where each of the three portions is effectively a separate unit which may be conveniently removed and replaced if desired.

One meritorious feature of the invention lies in the provision of a metering system permitting easy on-the-job adjustment of the relative proportions between the several materials, and wherein the material metering pistons are shifted within their cylinders by the pressure of incoming material discharging into the cylinders, obviating the need for a prime mover.

Other objects, advantages and meritorious features will more fully appear from the following description, claims and accompanying drawings, wherein:

FIG. 1 is a front elevation of metering apparatus embodying the invention;

FIG. 2 is a partial rear elevation of the apparatus of FIG. 1 showing only the lever system and adjustment means therefor;

FIG. 3 is an end elevation of the apparatus shown in FIG. 1;

FIG. 4 is a longitudinal cross-sectional view of one of the metering devices of FIG. 1;

FIG. 6 is a partial cross-sectional view taken along line 6—6 of FIG. 2;

FIG. 7 is a cross-sectional view taken along line 7—7 of FIG. 6;

FIGS. 8, 9 and 10 are front, side and top plan views respectively of the switch means for controlling the operation of the apparatus and associated locking bar assembly;

FIG. 11 is a longitudinal cross-sectional view of a safety device for shifting the metering valves to a neutral position when the apparatus is shut down; and FIG. 12 is a schematic representation of the control system and the fluid pressure lines in which the metering apparatus is disposed, while FIG. 13 is a schematic of the electrical control.

Figure 5:
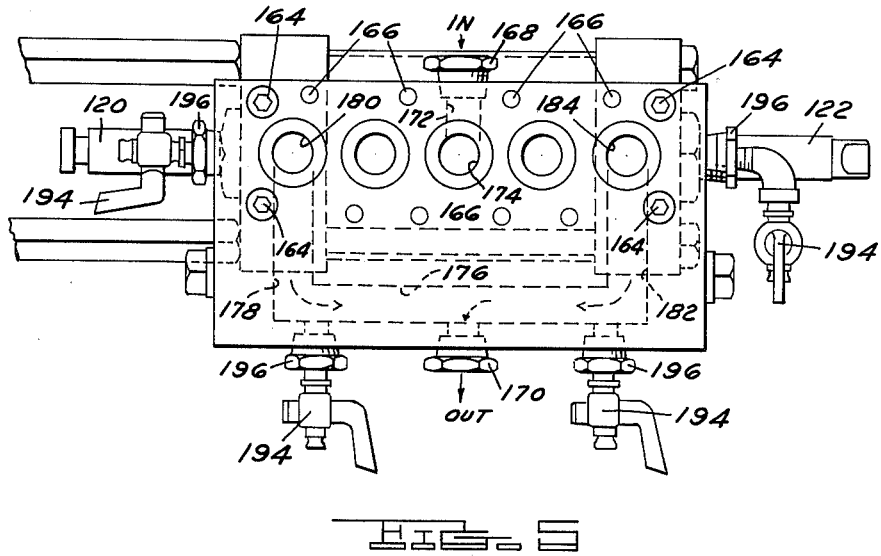
FIG. 5 is a cross-sectional view taken along line 5—5 of FIG. 4.

As shown in FIG. 12 at 20, 22 and 24 a plurality of pumps, or what may properly be termed devices for supplying material under pressure, are provided to deliver material through lines 26, 28 and 30 to respective metering assemblies 32, 34 and 36. In each metering assembly a material is accurately measured in determined proportional quantities and thereafter discharged through lines 38, 40 and 42 to a mixing device 44. In the system shown in the drawings, the single base material is handled by pump 22 and metering assembly 34 while the two accelerator materials are handled by similar apparatus 20, 32 and 24, 36 respectively. Obviously different arrangements could be provided to handle other materials, and the drawings merely illustrate one preferred embodiment.

As the two accelerator components will not begin to harden or cure on contact with each other, the lines 38 and 42 may be joined into a single line 46 and both accelerator materials conveyed thereby to the mixer 44. While the mixing device may take any form, the illustrative embodiment of the invention is herein described in connection with a mixer similar to that shown in detail in U.S. Patent No. 3,042,264. As shown in FIG. 12, a pair of valves 48 and 50 may be provided in the lines 40 and 46 to control material entry into the mixer, as more fully described hereinafter.

The system of FIG. 12 is actuated by air pressure through suitable solenoid operated valves although it will become apparent to those skilled in the art that such could be accomplished through electrical controls only or hydraulically.

Air is supplied to the system from a suitable source (not shown) through line 52 to a manual shut-off valve 54 and thence through the conventional filter, regulator and oiler to the four-way valve 56 which is controlled by the solenoid 58 and a second four-way valve 59 controlled by solenoid 60. Valves 56 and 59 are of the spring return type, and are biased to their normal position with springs as schematically shown in FIG. 12. With solenoids 58 and 60 de-energized, valves 56 and 59 are spring held in the position whereby air pressure is supplied through line 62 to one side of valves 48 and 50 shifting such valves to their position blocking material conduits 40 and 46 to prevent material entry to the mixer 44, while line 76 is on exhaust, so mixer 44 is inoperative. Air is also furnished from valve 56 through branch line 64 to the safety device 66 illustrated in detail in FIG. 11 which operates to shift its associated metering valve to a neutral position blocking material entry to or discharge from the meter assembly as hereinafter described more fully. Each meter assembly 32, 34 and 36 would be provided with such a safety device, but only one has been illustrated in FIG. 12 in the interest of clarity.

Actuation of solenoid 60 reverses valve 59 to pressurize line 76, supplying air through manual valve 82 to an air motor 84 driving the rotor (not shown) of mixer 44. Actuation of solenoid 58 reverses valve 56, exhausting air lines 62 and 64 and pressurizing supply line 68 leading to a second four-way valve 70 which is controlled by two solenoids, 72 and 74, as shown. Line 68 connects with branch lines 78 and 80 ahead of valve 70 to supply air pressure to the mixer valves 48 and 50 and also to pumps 20, 22 and 24 as follows: Line 78 and its branch 86 communicate respectively with valves 48 and 50 to shift the valves to their position admitting material to mixer 44. Line 80 supplies air pressure to the material pumps 20, 22 and 24.

Valve 70 might properly be termed a meter control valve, and supplies air under pressure alternately to first one end and then the other end of fluid pressure cylinders in each metering assembly 32, 34 and 36 through lines 88 and 90 and their branch lines as shown in FIG. 12 and described hereinafter. Actuation of valves 70 is by the solenoids 72 and 74, which are energized and de-energized by movement of the metering assemblies, as will also more fully appear hereinafter.

Referring now to FIGS. 1, 4 and 5, there is shown the three metering assemblies 32, 34 and 36, which comprise generally a cylinder-piston portion 100, a manifold block 102 and a valve portion 104. As the three assemblies are of substantially identical construction, a detailed description of assembly 32 will suffice for all. As clearly shown in FIG. 4, the portion 100 includes a pair of opposed cylinder heads 106 and 108 spaced apart by a cylinder defining member 110 received in an annular slot 112 in each head. The end faces of member 110 are spaced from the respective cylinder heads to define a metering cylinder 113 having radially extending portions at its opposite ends as shown in FIG. 4. The two cylinder heads are tensioned toward each other and secured together by draw bolts 114, the heads of which overlie cylinder head 108 while the opposite ends are threaded into cylinder head 106. Each cylinder head is provided with an axial aperture threaded to accommodate a packing nut 116 axially bored for reception of a piston shaft or rod 118. Each packing nut exhibits internal annular grooves within which are disposed Teflon seals 119 and O-ring seals encircling the rod 118 to prevent escape of material from the metering cylinder around the rod.

The piston rod 118 extends completely through the cylinder to project beyond opposite ends thereof and comprises two parts 120 and 122 threadedly connected as shown in FIG. 4. Disposed between opposed ends of portions 120 and 122 is a piston 123 comprising Teflon or the like piston cups 124 and 126 separated by a spacer piston 128 and held in radially expanded position by metal inserts 130 and 132. The cups 124 and 126 sealingly wipe the internal cylindrical surface of the cylinder 110. The parts of the piston 123 are supported upon a reduced diameter portion 134 of rod portion 120 as shown in FIG. 4. Each cylinder head 106 and 108 is provided with an L-shaped passageway 136 and 138 opening into the opposite ends of the metering cylinder 113.

Each manifold 102 and valve portion 104 (FIGS. 4 and 5) cooperate to define a valve mechanism for controlling the admission and discharge of material to and from the metering cylinder 113. The valve portion 104 comprises a cylindrical valve body 140 closed at one end by a packing nut 142 held fixed by a lock nut 144 and sealed at the opposite end by sealing rings 145 having a spacer 146 therebetween. Nut 142 and spacer 146 are suitably bored to accommodate spool-type valve rod 148 which extends completely through and beyond valve body 140 as shown. Surrounding rod 148 are a plurality of sealing rings 150 held in spaced apart relation in valve body 140 by suitable retaining rings 152. Between adjacent seals 150 the valve body 140 exhibits five laterally opening apertures 154, 156, 158, 160 and 162 to establish communication between the valve portion 104 and the manifold 102.

Manifold 102 is coupled between valve portion 104 and metering portion 100 and defines material conducting passages establishing communication therebetween. More particularly manifold 102 is secured as by bolts or the like 164 to the cylinder heads 106 and 108, and the valve body 140 is secured to the manifold by similar bolts 166. Manifold 102 exhibits a material inlet 168 in one side thereof and a material outlet 170 in the opposite side as shown in FIG. 5. Inlet 168 communicates through manifold passages 172 and 174 with valve opening 158 (see FIG. 4). Outlet 170 communicates with valve opening 154 through manifold passages 176, 178 and 180 and with valve opening 162 through manifold passages 176, 182 and 184 (see both FIG. 4 and FIG. 5). The manifold also defines a passage 186 establishing communication between valve opening 156 and metering cylinder passageway 136, and another passage 188 establishing communication between valve opening 160 and metering cylinder passageway 138.

Coordinating FIGS. 4 and 5 with FIG. 12, assuming the above description relates to assembly 32, material line 26 from source 20 is coupled to manifold inlet 168, while material line 38 is connected to manifold outlet 170. As shown in FIG. 4, valve rod 148 exhibits a pair of reduced diameter portions 190 and 192 which serve to establish communication between various of the above described passages as the valve rod is shifted back and forth, as hereinafter set forth in greater detail. The manifold 102 is provided with a plurality of manually operated drain or bleed valves 194 whereby the valves may be opened to purge air from the system. Each of the valves 194 is of conventional construction and is threaded into a suitable reducing bushing 196 which is in turn threaded into an aperture in the manifold block.

Means 200 for shifting valve rod 148 comprise a cylindrical housing 202 closed at opposite ends by caps 204 and 206 to define an air cylinder. Tie rods 208 tension caps 204 and 206 toward each other with O-rings 210 sealing the cap-to-cylinder joint and O-ring 212 sealing against escape of air around rod 148. An air piston 214 is slid over the reduced threaded end 216 of rod 148 and secured thereto by a lockwasher 218 and nut 220. Cap 204 exhibits a hub 222 within which is received spacer 146, and hub 222 has a flange 224 at the outer end thereof through which extend bolts or the like (not shown) securing the valve shifting means 200 to the valve body 140. Air inlets are provided in opposite ends of the air cylinder through caps 204 and 206, one of which is shown at 226 in FIG. 4, the other being hidden. Such air inlets are coupled to air supply lines 88 and 90 respectively of FIG. 12 communicating with four-way valve 70 such that when one line is pressurized the other is exhausted. The valve shifting means 200 is thus positive acting in both directions.

A base and linkage assembly is shown in FIGS. 1, 2 and 3 for supporting the metering assemblies 32, 34 and 36 and for adjusting the relative proportional quantities of material measured by the meters. Each metering assembly is suspended from the beam assembly having lower and upper flanges 250 and 252 by spaced rods or the like 254 (see also FIG. 4) threaded at one end into the cylinder head 106 and with their opposite ends extending through flange 250 and provided with nuts 256. The spacer rods 254 serve to hold the parts in spaced relation. Spacer blocks 260 are secured between flanges 250 and 252 to provide a rigid structure. Each metering cylinder piston rod 118 is coupled by a suitable connector 262 to a piston rod extension member 264. For clarity, parts associated with metering assembly 32 will be described, and similar parts of assembly 34 will be indicated by the same numerals primed, while parts of assembly 36 will be double primed, as in FIGS. 1, 2 and 3. Member 264 extends through suitable apertures in flanges 250 and 252 and is supported for reciprocation in a bearing sleeve 266.

Rod extension 264 of metering assembly 32 is connected at its upper end to the extremity of a rocker arm 268 through a pair of links 270 and 272 pivoted at opposite ends to the extension and the bar on link pins 274. Extension 264″ of assembly 36 is similarly connected to a second rocker arm 276 through links 270″ and 272″ and the link pins 274″. The center or base material metering rod extension 264′ is provided at its upper end with a cross block 278 which is in turn connected to the inner adjacent ends of both rocker arms 268 and 276 by similar links shown at 270′ (four in number) and link pins 274′ (four in number).

Figures 7, 8:
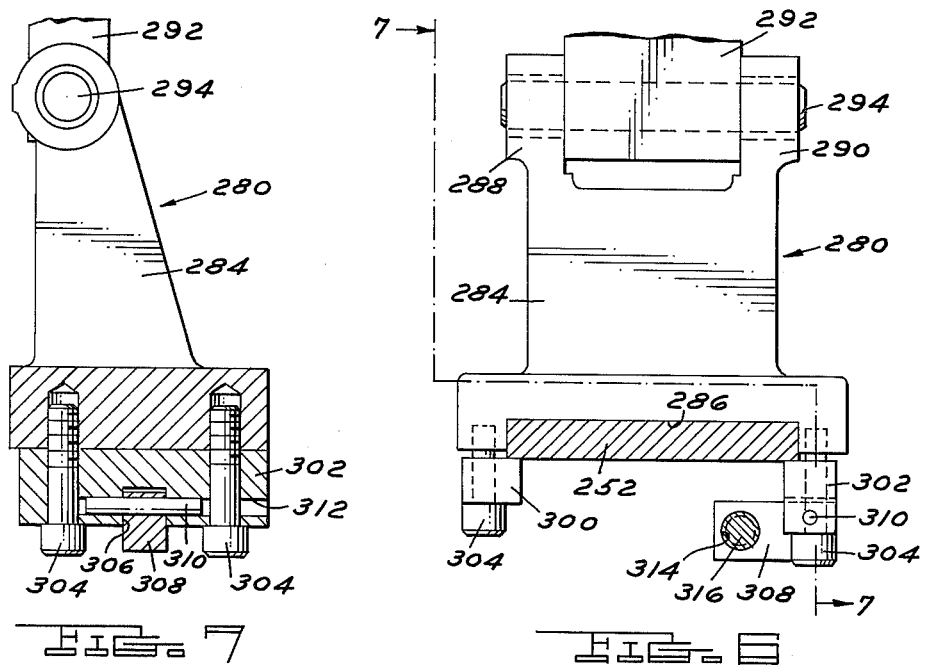

Each rocker arm 268 and 276 is provided with a pivot assembly 280 and 282 respectively, identical in construction but oppositely disposed, as shown in FIG. 1. A description of 280 will suffice for both. Referring to FIGS. 6 and 7, the assembly 280 includes a bracket 284 having a guideway 286 machined in the underside thereof for slidable guided movement along the beam 252. The upper end of bracket 284 defines two upstanding ears 288 and 290 between which is positioned a clamping block partially shown at 292 in FIGS. 6 and 7 pivotally supported in the bracket on a pivot pin 294. Block 292 is of U-shape with arm 268 slidably embraced thereby, and is provided with a top block 296 secured to the extremities of the legs of the block 292 as by bolts 298 as shown in FIGS. 1, 2 and 3. Block 296 is centrally threaded and has a bolt 299 extending therethrough adapted to bear against the upper surface of arm 268 to lock the assembly 280 to the arm.

Referring back to FIGS. 6 and 7, a pair of locking pads 300 and 302, are secured to the underside of bracket 284 as shown by bolts or the like 304. Pad 302 has a cut-out therein at 306 within which is positioned a guide block 308 held in position by a dowel pin 310 pressed into aperture 312 in the pad. Guide block 308 has a threaded aperture 314 therethrough through which extends a threaded shaft 316 (see FIG. 2).

Threaded shaft 316 is journaled in block 112 (FIGS. 1 and 2) and is provided at its outer end with a hand wheel 318 having a projection handle 320. By engagement of shaft 316 and guide block 308, rotation of hand wheel 318 to turn the shaft serves to reposition the assembly 280 along the rocker arm 268, assuming the bolt 298 and the locking pads 300 and 302 have been loosened. As can be seen from an examination of FIG. 1, or FIG. 2, the axis of pin 294 serves as a fulcrum for rocker arm 268, which is a lever of the first order. By varying the position of the fulcrum along the length of the arm the relationship between the strokes of the pistons in metering assemblies 32 and 34 may be varied. Similarly, by shifting the clamping assembly 282 along lever 276, the same variation is possible between assemblies 34 and 36. As the stroke of base metering assembly 34 is determined by control means described herebelow, the strokes of accelerator metering assemblies 32 and 36 are determined by the position of assemblies 280 and 282 along their respective arms 268 and 276. It will be obvious from a review of the above with reference to FIGS. 1 and 2 that the action of assembly 34 will be opposite that of assemblies 32 and 36. That is, when the piston rod of assembly 34 is travelling downwardly as seen in FIG. 1, the piston rods of assemblies 32 and 36 will be moving upwardly, and vice versa.

A pair of ratio scales 322 are affixed to the beam assembly, and each clamping assembly 280 and 282 has depending therefrom a scale indicator 324, so when the clamping assemblies are shifted along the arms 268 and 276, their position may be conveniently read on the scales 322.

Secured to the front side of beams 250 and 252 as by screws or the like 330 (FIG. 1) is a mounting plate 332 which supports the switch assembly illustrated in FIGS. 8, 9 and 10 for controlling the sequential operation of the metering assemblies 32, 34 and 36, the electrical schematic for which is shown in FIG. 13. FIG. 10 shows switch boxes 334 and 336 mounted respectively on the front and rear of plate 332. Box 336 houses the switih shown at S–1 in FIG. 13, the contacts of which are opened and closed by movement of a flexible actuating arm or wand 338 as hereinafter described. Box 334 houses two sets of contacts, S–2 and S–3. From FIG. 13 it can be seen that switch S–1 controls operation of the entire circuit, while S–2 controls solenoid 74 and S–3 controls solenoid 72. It can also be seen that S–1 must be closed before the circuit it operative.

FIG. 8 shows a part of box 334 with its cover removed to expose switch actuating rod 340 having a pair of spaced apart collars 342 and 344 thereon adjustably secured to the rod as by set screws or the like. While not shown in FIG. 8, the two sets of contacts S–2 and S–3 may be easily visualized as positioned in vertically spaced relation adjacent rod 340 to be actuated by the collars 342 and 344 upon reciprocation of the rod in the box. As the rod moves upwardly, collar 342 closes contacts S–2, and as the rod shifts downwardly, collar 344 closes contacts S–3. By reference to FIG. 3 it can be seen that the rod 340 is secured to a bracket 345 which projects from block 278 (see FIG. 1), and thus the rod 340 reciprocates with block 278 and its connected rods 264′ and 118′.

Switch S–1 is actuated by flexible wand 338 as noted above, which is embraced by a bracket 346 of inverted U-shape. The wand 338 extends between the legs of bracket 346 and is held against one of the legs by a screw 348 threaded through the opposite leg. A plate 350 depending from bracket extends toward switch bor 336 and is secured at its outer end to a plunger rod 352 projecting through an aperture in plate 332. A handle 354 having a yoke portion 356 is pivoted to rod 352 as at 358, and a spring 360 interposed between plates 332 and 350 biases the assembly in the direction of the arrow in FIGS. 9 and 10. A guide pin 361 secured to plate 332 and projecting between the legs of handle 354 prevents the handle from becoming misaligned. The lower end of handle 354 bears against plate 332 as shown in FIG. 9, so movement of the upper end of the handle shifts rod 352 back and forth, carrying with it bracket 346 to move the wand 338 from its position shown in phantom at 338′ of FIG. 10 opening switch S–1, to its position shown in solid outline, closing switch S–1.

Handle 354 is apertured at 362 to accommodate a locking pin 364, which projects from a bar 366 secured against loss to plate 332 by a chain or the like 368. As handle 354 and rod 352 are biased by spring 360 to hold wand 338 in a position opening S–1, movement of handle 354 to the position shown in FIG. 9 closes the switch S–1, and the pin 364 is then inserted through rod 352 and bearing against the plate 332 to keep the switch closed for machine operation.

FIG. 11 shows the details of safety device 66 shown in FIG. 12. As stated, there is a device 66 for each metering assembly, and as they are identical, a description of one connected to assembly 32 of FIG. 4 will suffice. A piston rod 370 is coupled to the free end of valve rod 148 (FIG. 4) as shown in FIG. 11. Cylindrical member 372, closed at opposite ends by cylinder heads 374 and 376 tensioned toward each other by bolts 378 defines an air chamber 380 having air inlets 382 and 384 at opposite ends thereof. Chamber 380 is divided by pins 386 posiitoned spaced around the member 372 and projecting through the chamber wall as shown. On either side of retainer 386 is a free-floating piston 388 and 390 shiftable within the chamber, with piston 390 axially bored to admit the end of rod 370, which is held in engagement with the piston by a disk 392 secured to the rod end. A packing nut 394 may also be provided surrounding valve rod 148 and coupled to hub 396 on head 376 by a suitable connector 398. Air supply line 64 (FIG. 12) is coupled through its branch lines to the opposite ends of the device 66 for purposes to be detailed hereinafter.

Referring to FIGS. 1 and 9, piston rod extension 264' of metering assembly 34 exhibits an annular groove 399 into which plunger rod 352 shifts to move wand 338 opening switch S–1. Groove 399 is so positioned that when plunger rod 352 enters the groove the arms 268 and 276 are parallel to beam flange 252, which, as can be seen from FIG. 1, is essential in order that the pivot assemblies 280 and 282 may be repositioned along the arms 268 and 276. This arrangement insures the correct positioning of the assembly whenever the machine is stopped by the opening of switch S–1, which must be closed for the machine to run. FIG. 13 shows a start switch S–4 which controls the normal sequential operation of the machine. S–4 is preferably a normally spring biased open switch which may be foot operated, and is held closed by the operator. Alternately, the duration of machine operation could be controlled automatically by a suitable controller.

In FIG. 13 is also shown schematically a timer T, which upon the closure of S–4, will permit immediate energization of solenoid 60, but will delay for a predetermined period energization of solenoid 58 and solenoid 74 or 72, depending on which of S–2 and S–3 is closed. Thus the mixer motor is started before the actuation of the meter valves and mixer inlet valves to insure proper mixing. The timer T is adjustable so that the interval may be determined by the operator.

*Operation*

In order to prepare the apparatus for use, the clamping assemblies 280 and 282 must be so positioned along the arms 268 and 276 to provide the correct proportional amounts of the various materials. In order to set the pivot points for the arms, the two links 270' shown in FIG. 1 are provided with apertures 400 and 402 which are in alignment with similar apertures in block 278 only when the arms 268 and 276 are disposed parallel to beam 252. Obviously this condition of parallelism must exist to permit the assemblies 280 and 282 to be adjusted. To ascertain this condition the member 366 (FIGS. 1 and 8) has projecting therefrom a pair of spaced pegs 404 and 406 receivable within apertures 400 and 402 and therebeyond into block 278.

With the mechanism set as above, assemblies 280 and 282 may be positioned at the desired location by loosening bolts 304 (FIGS. 6 and 7) and clamping bolts 299 and turning handles 318 to slide the assemblies on beam 252. The bolts are then tightened to lock the assembly in place and pegs 404 and 406 removed from apertures 400 and 402. Assuming all the material and control lines are connected as shown in FIG. 12 and the sources of material under pressure 20, 22 and 24 are in position, the apparatus is then cycled to charge the system and purge air from the various lines and cylinders. The valves 194 (FIG. 5) on each metering assembly 32, 34 and 36 are opened, and handle 354 moved to its position shown in FIG. 9 to close switch S–1, setting up the circuit to be energized (FIG. 13). Now the machine may be run by the closure of switch S–4.

When S–4 is held closed, solenoid 60 is first energized, pressurizing line 76 to start mixer motor 84. When timer T times out, solenoid 58 will be energized, exhausting air lines 62 and 64, and pressurizing lines 68, 78 and 80 to supply air to open the mixer valves 48 and 50, to the pumps 20, 22 and 24 and to four-way valve 70 as shown in FIG. 12. Simultaneously, current is fed to switches controlling meter valves. With switch contacts S–3 closed (see FIG. 13) to energize solenoid 72, valve 70 will be shifted to its position pressurizing line 88. This supplies fluid under pressure to one end of air cylinder 200' in metering assembly 34 through branch line 408, while simultaneously pressurizing the opposite end of cylinder 200 in assembly 32 through branch 410 and cylinder 200'' in assembly 36 through branch 412, as shown in FIG. 12. This will shift the metering valve in base assembly 34 in one direction while shifting the corresponding valves in accelerator assemblies 32 and 36 in the opposite direction. Referring to FIG. 1, piston rod member 264' will be travelling upwardly, carrying with it block 278 and rod 340, while members 264 and 264'' are moving downwardly. As rod 340 shifts upwardly within box 334 (FIG. 8) collar 342 moves toward switch contacts S–2 (FIG. 13), and when the collar closes these contacts, solenoid 74 is energized (see FIG. 12) to pressurize line 90 and exhaust line 88. This operates to reversely pressurize each of the cylinders 200, 200' and 200'', reversing their respective metering valves. It can be seen that the closing of contacts S–2 and S–3 is momentary, to energize solenoids 74 and 72 respectively only long enough to shift valve 70, which remains in one position until shifted by the solenoid. Release of switch S–4 (FIG. 13) will stop the machine.

Referring specifically to FIGS. 4 and 5, the operation of metering assembly 32 will be considered separately in detail. Pressurization of cylinder 200 through port 226 shifts valve spool 148 from its neutral position as shown in FIG. 4 to the left as viewed therein. Material under pressure from source 20 flows through conduit 26 (FIG. 12) through inlet 168 (FIG. 5) and thence into passages 172, 174, valve opening 158, past reduced valve portion 192, valve opening 160, and passages 188 and 138 to the right-hand end of metering cylinder 113 as shown in FIG. 4. The pressure of material shifts piston 123, piston rod 118 and extension 264 to the left, and the movement of piston 123 forces material out of the lefthand end of cylinder 113 through passages 136 and 186, valve opening 156, past spool portion 190, valve opening 154, passages 180, 178 and 176 and out through manifold outlet 170 (FIG. 5). The exhausted material is forced through conduits 38 and 46 and mixer valve 50 into the mixer 44 (see FIG. 12). While this is occurring in metering assembly 32, the other accelerator material is flowing in similar fashion from source 24 through conduit 30 and metering assembly 36, and conduits 42 and 46 to the mixer 44. In addition, base material flows simultaneously from source 22 through conduit 28, meter 34, conduit 40 and mixer valve 48 to the mixer 44. However, the flow through assembly 34 is opposite to the flow through assemblies 32 and 36, because of the nature of the interconnecting linkage as shown in FIG. 1.

Referring briefly back to FIGS. 4 and 5, when the contacts S–3 are closed (FIGS. 12 and 13) cylinder 200 will be reversely pressurized, shifting valve spool 148 to the right as viewed in FIG. 4. Material under pressure will then flow from inlet 168 through 172, 174, 158, past 190, through 156, 186 and 136 to the left-hand end of cylinder 113 to shift piston 123, and rods 118 and 264 to the right. At the same time material will be exhausted from the right-hand end of 113 through 138, 188, 160, past 192, through 162, 184, 182, 176 and outlet 170 to conduit 38 (FIG. 1) and thence to mixer 44.

Referring to FIGS. 12 and 13, when S-4 is opened, solenoids 58 and 60 are de-energized, and valves 56 and 59 spring-returned to their inoperative positions. This stops air motor 84 and reverses valves 48 and 50 to prevent material entry to mixer 44. Line 64 is also pressurized, supplying air to opposite ends of safety device 66 through ports 382 and 384 (FIG. 11). Pistons 388 and 390 are shifted to their positions shown, and piston rod 370 carries valve rod 148 (see FIG. 4) to its midpoint or neutral position, preventing material entry or exit from the meter valve, and trapping material therein at the operating pressure. Hence when machine is stopped by opening of S-4, each meter valve shifts to a neutral "fllow-blocking" position.

From the above it can be seen that once the system is charged with the base and accelerator materials, the apparatus may be cycled repeatedly to proportionally meter the materials and mix them together and dispense the resulting mixture. The proportion between the base material handled by assembly 34 and either of the accelerator materials handled by assemblies 32 or 36 may be easily and conveniently varied by adjustment of the respective clamping assembly 280 or 282 along its arm 268 or 276. Further, the movement of the material metering pistons with their associated rods and linkage assembly is caused by the pressure of the materials being metered. Therefore, external motive means, in this case air under pressure, is utilized only to shift the spool valves of the metering assemblies, and as even the pressurization of the air cylinders is controlled by movement of the material piston rods through actuating rod 340, the operation of the entire system is actually self-governing. As the spool valves of the apparatus shift almost instantaneously, the flow of material through the system and of mixture from the outlet is substantially pulse-free.

Important advantageous features lie in the provision of structurally independent metering assemblies. For example, each of the metering assemblies may be completely removed from the system for repair or replacement by merely disconnecting the material lines, uncoupling piston rod 118 from extension rod 264, and removing nuts 256 to allow the entire assembly such as 32 to drop free from beam 250 (FIG. 1). Entire metering assemblies may therefore be stocked for quick and easy replacement in the system in a matter of a few minutes, eliminating costly "down-time" and extensive repairs in the field. The defective assembly is merely removed and replaced by another from stock, whereupon the system is again operative and the defective assembly can be repaired later or returned to the factory on an exchange basis. Further, the constituent parts of each metering assembly, i.e., cylinder-piston portion 100, manifold block 102 and valve portion 104 are so constructed and assembled together that any one of the three may be easily disconnected from the assembly for replacement by a new part. This greatly simplifies repairs and materially reduces repair and replacement costs.

It will be obvious to those skilled in the art from the above detailed description of a system for handling three materials that the apparatus shown could be modified to handle other numbers of materials without departing from the teachings of the invention. For example, the apparatus shown could be easily converted to a system for handling a two-part, rather than a three-part material. In addition, various controls might be utilized to render the operation fully automatic.

What is claimed is:

1. Apparatus for continuously proportionally metering and mixing together a plurality of flowable materials comprising, in combination: a source of each component material under pressure; a metering chamber for each material having a single opening at each opposite end thereof for material admission to and material discharge from said chamber and a metering piston reciprocable within the chamber provided with a piston rod extending outwardly through a chamber end wall; mixing means for mixing said materials together having a separate inlet for each material and an outlet for the mixture; a manifold coupled with each metering chamber having a material inlet and a material outlet opening therethrough in spaced apart relation and exhibiting material passageways establishing communication between both of said metering chamber openings and said manifold inlet and outlet; means coupling each material source to a respective manifold inlet in closed feed relationship; means coupling each manifold outlet to a respective inlet of said mixing means in closed feed relationship; valve means in flow controlling communication with said manifold passageways for alternately connecting first one end and then the other end of the metering chamber to a source of material under pressure while simultaneously connecting the remaining end of the chamber to said mixing means whereby the pressure of material shifts the metering piston first toward one end and then toward the other end of the chamber, as determined by the position of valve means, to dispense metered quantities of material therefrom; motive means coupled to each of said valve means to operate the same; and a control system coupled to all of said motive means and responsive to piston rod movement for causing the latter to operate all of the valve means simultaneously.

2. Apparatus for continuously proprotionally metering and mixing together a plurality of flowable materials comprising, in combination: a source of each material under pressure; independent metering means for each material including an enclosed metering cylinder having a single opening at each opposite end thereof for material supply to and discharge from the cylinder and a metering piston reciprocable within the cylinder provided with a piston rod extending beyond the cylinder through an end wall thereof; a manifold block coupled to each of said metering cylinders having an inlet and an outlet and defining closed feed passageways establishing communication between said inlet and outlet and each of said cylinder openings; means coupling each of said sources of material under pressure with a respective manifold inlet in closed feed relationship; mixing means for said materials having a separate inlet for each material coupled to a respective manifold outlet and an outlet for the mixed materials; valve means operatively connected with each manifold block in flow controlling communication with the manifold passageways for alternately establishing communication first between the opening at one end of the metering cylinder and said source and then between the opening at the opposite end of the cylinder and the source while simultaneously establishing communication between the remaining metering cylinder opening and a respective mixing means inlet whereby the pressure of material from the source shifts the metering piston to discharge material from first one end and then the opposite end of the cylinder through the manifold passageways and outlet to the mixing means; and control means operatively coupled to each of said valve means and to said metering means and responsive to the movement of said metering piston rods to opposite ends of their strokes to operate said valve means.

3. The invention as defined in claim 2 characterized in that said control means includes a part positioned to be actuated by one of said piston rods at opposite ends of its stroke, with said part being adjustable axially along the length of such piston rod for selectively determining the time of actuation of said valve means to reverse the pressurization of the cylinder-piston assemblies.

4. The invention as defined in claim 3 characterized in that said control system part positioned to be actuated by movement of said piston rod comprises a rod coupled to the piston rod for reciprocation in parallel relation therewith and switch means for controlling actuation of said valve means, said rod carrying switch actuating means selectively adjustable along the length of the rod to vary the actuation of the motive means and thereby vary the stroke of said piston rod and its associated metering piston.

5. In a system for metering and mixing together a plurality of flowable materials having a source for each material under pressure, an independent metering means for each material coupled with a respective source, and mixing means including a mixing chamber with a rotor therein and a motor driving the rotor, control means for the system comprising actuating mechanism coupled to both said metering means and said mixing means to actuate the metering and mixing means, said mechanism including a timer operable to actuate said mixing means a predetermined time interval before the actuation of said metering means.

6. The invention as defined in claim 5 characterized in that said timer is manually adjustable to vary the time period elapsing between the actuation of said mixing means and said metering means.

7. A system for continuously proportionally metering the plural part flowable materials comprising, in combination: a source of each material under pressure; independent metering means for each material, each such metering means including a positive displacement cylinder-piston assembly having a double-acting piston with a piston rod connected thereto projecting beyond an end wall of the cylinder, and said cylinder having a single material conducting opening at each opposite end thereof; a manifold block secured to each metering cylinder having a material inlet and a material outlet and defining passageways establishing communication between both the inlet and the outlet and each of said metering cylinder openings; mixing means for said materials having a separate inlet for each material and an outlet for the mixture; conduit means connecting each source of material with a respective manifold inlet and each manifold outlet with a respective mixing means inlet; valve means in flow controlling communication with each manifold for alternately establishing communication first between one end of the metering cylinder and a source of material and then between the opposite end of the cylinder and said source while simultaneously establishing communication between the remaining cylinder opening and a respective mixing means inlet to thereby admit material under pressure alternately to opposite ends of the metering cylinder thereby reciprocating metering piston to discharge material first from one end and then from the opposite end of the cylinder through the manifold to said mixing means; means retaining said metering assemblies in spaced parallel relation; a rigid lever of the first order pivotally connected at spaced points therealong to the projecting ends of each adjacent pair of piston rods, with the fulcrum point of said lever being adjustable therealong to vary the relationship between the strokes of adjacent pistons; and control means operatively coupled to each of said valve means and to each of said metering means responsive to the movement of said metering piston rods to opposite ends of their strokes to operate said valve means.

8. The invention as defined in claim 7 characterized in that each of said valve means includes a valve body member shiftable between opposite ends of its stroke for selectively establishing communication among said material source, metering means and mixing means, said valve body being shiftable to the neutral intermediate position between opposite ends of its stroke positively blocking material flow through said manifold when in such neutral position.

9. The invention as defined in claim 8 characterized in that said control means includes independent actuating means coupled to said valve body to shift the same to said neutral position blocking the flow of material through said manifold passage.

10. The invention as defined in claim 7 characterized in that said metering piston rods are each provided with a piston rod extension member pivotally connected at one end to said lever and releasably rigidly coupled to the piston rod at the opposite end whereby said piston rod may be uncoupled from said extension member without disturbance to the remaining parts of said system.

References Cited by the Examiner

UNITED STATES PATENTS

| | | | |
|---|---|---|---|
| 1,932,976 | 10/1933 | Lamb et al. | |
| 2,946,488 | 7/1960 | Kraft | 222—134 |
| 3,071,293 | 1/1963 | Lewis-Smith et al. | 222—135 |

FOREIGN PATENTS 528,221   3/1953   Italy.

RAPHAEL M. LUPO, *Primary Examiner.*

HADD S. LANE, *Examiner.*